United States Patent [19]

Numata et al.

[11] Patent Number: 4,551,605
[45] Date of Patent: Nov. 5, 1985

[54] GUN ARM APPARATUS FOR RESISTANCE WELDING GUN

[75] Inventors: Morikuni Numata, Ageo; Toshihiko Nakadate, Sayama, both of Japan

[73] Assignee: Honda Giken Kogyo Kabushiki Kaisha, Tokyo, Japan

[21] Appl. No.: 566,071

[22] Filed: Dec. 27, 1983

[30] Foreign Application Priority Data

Dec. 27, 1982 [JP] Japan .............................. 57-195610[U]
Dec. 27, 1982 [JP] Japan .............................. 57-195611[U]

[51] Int. Cl.⁴ .............................................. B23K 11/10
[52] U.S. Cl. .................................. 219/86.31; 219/89; 219/90
[58] Field of Search ......................... 219/86.31, 89, 90

[56] References Cited

U.S. PATENT DOCUMENTS 3,523,172 8/1970 Wilbur ................................. 219/89
4,356,373 10/1982 Mattson et al. ................... 219/86.31

Primary Examiner—Roy N. Envall, Jr.
Assistant Examiner—Alfred S. Keve
Attorney, Agent, or Firm—Armstrong, Nikaido, Marmelstein & Kubovcik

[57] ABSTRACT

The present invention is directed to a gun arm for a resistance welding gun. The gun arm comprises a main body, an electrode holder mounted on the front portion of the main body and a support member fixed to the rear portion of the main body. The main body comprises a conductor member having a water passage on at least one side thereof and a plate member fixed to at least one side of the conductor member and in contact with the water passage. In one embodiment of the present invention, the water passage comprises at least one groove formed in the conductor member with the groove being covered by the plate member. In an alternative embodiment, the water passage comprises at least one pipe which is positioned between the plate members which comprise the at least one plate member.

5 Claims, 6 Drawing Figures

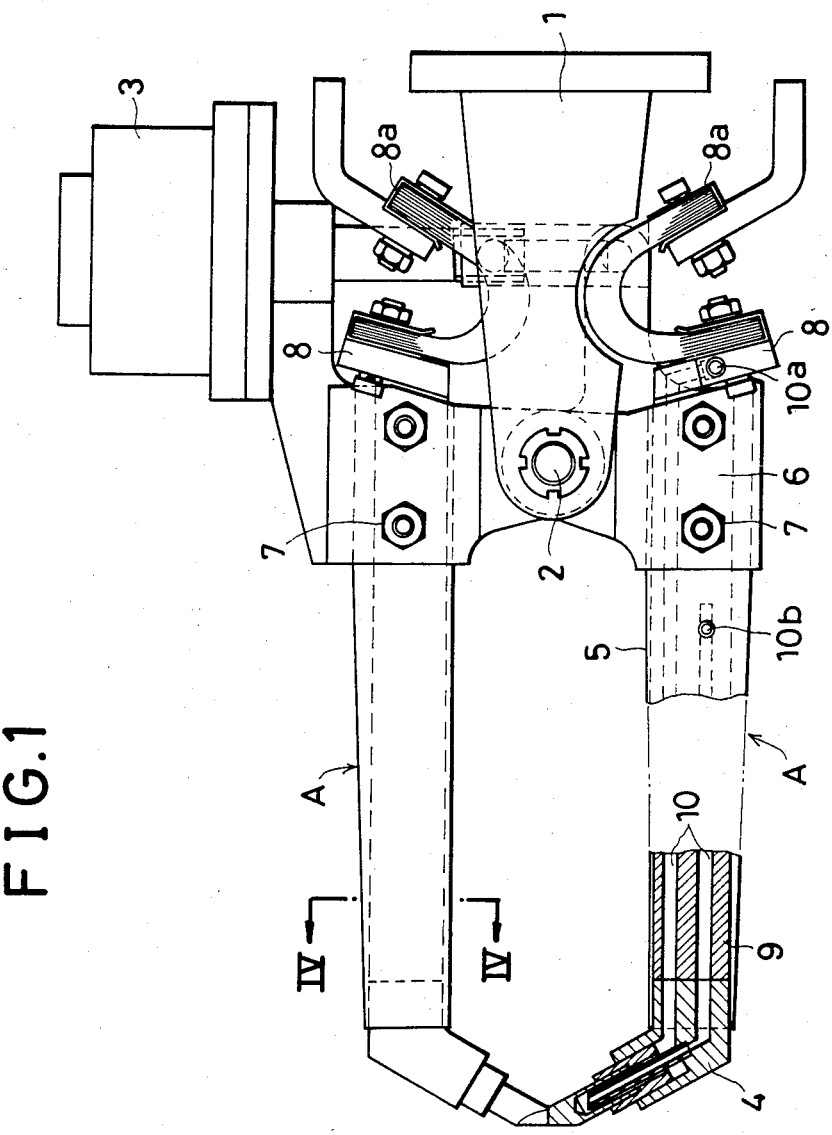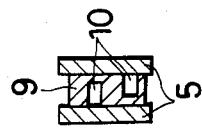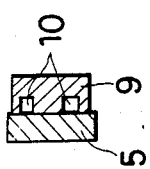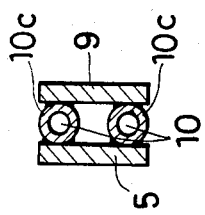

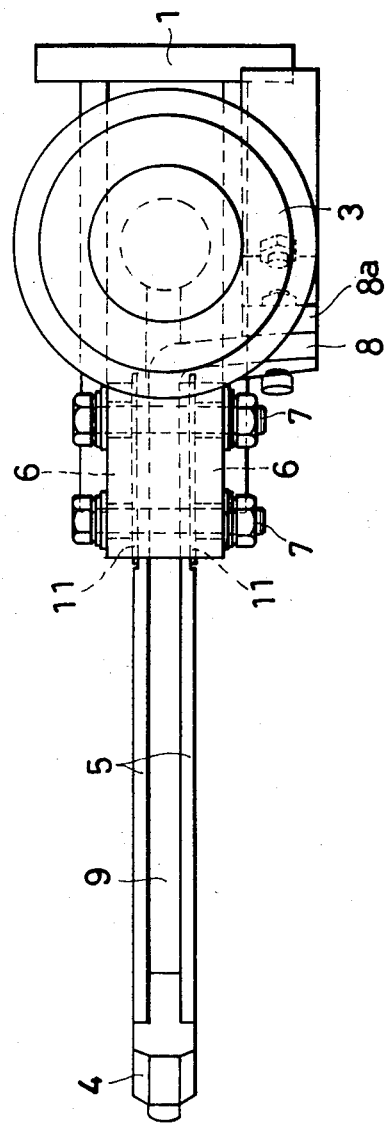
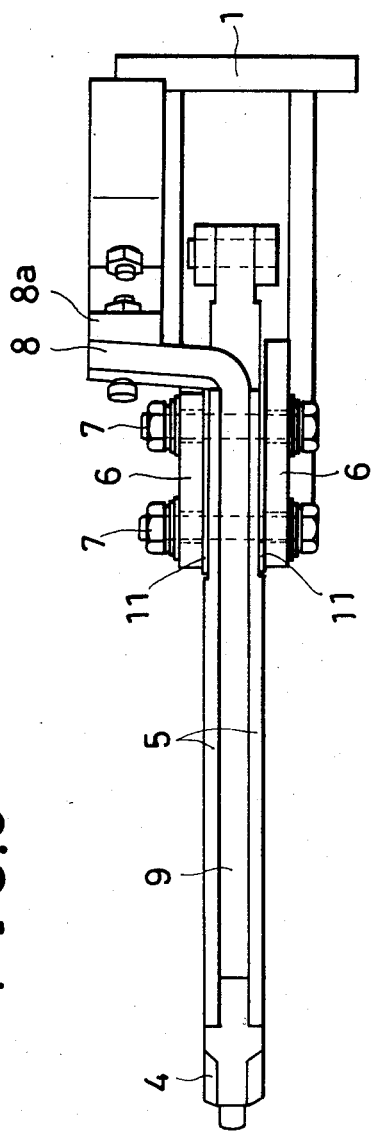

GUN ARM APPARATUS FOR RESISTANCE WELDING GUN

BACKGROUND OF THE INVENTION

1. Field of the Invention

This invention relates to a gun arm apparatus used chiefly for a portable type resistance welding gun.

2. Description of the Prior Art

In prior art portable resistance welding guns, the gun arm main body has at its front end portion an electrode holder and at its rear end portion a supporting member. A conductor connects the electrode holder to a source of electric power. Additionally, a water passage means is provided in the main body for cooling.

Japanese Utility Model Application Publication No. Sho 57-24455 discloses a gun arm in which the main body is formed of a tubular body made of a comparatively thin plate, and a copper pipe is provided therein which functions as both the conductor and the water passage means. This arrangement, however, is inconvenient in that it is difficult to make a copper pipe with a sufficient electric current capacity, and the gun arm apparatus becomes comparatively large in cross-sectional area because of the fact that the main body is tubular in form. Additionally, the gun arm becomes complicated in construction and difficult to manufacture.

SUMMARY OF THE INVENTION

It is the primary object of the present invention to provide a gun arm for a resistance welding gun in which the gun arm has an electrical conductor for carrying electric current to the welding electrodes and which also has water passage means for carrying cooling water wherein the gun arm is comparatively small in cross-sectional area and which is simple in construction.

The present invention is directed to a gun arm for a resistance welding gun. The gun arm comprises a main body, an electrode holder mounted on the front portion of the main body and a support member fixed to the rear portion of the main body. The main body comprises a conductor means having a water passage means on at least one side thereof and a plate means fixed to at least one side of the conductor means and in contact with the water passage means. In one embodiment of the present invention, the water passage means comprises at least one groove formed in the conductor means with the groove being covered by the plate means. In an alternative embodiment, the water passage means comprises at least one pipe means which is positioned between the plate means which comprises two plate members.

BRIEF DESCRIPTION OF THE DRAWINGS

FIG. 1 is a side view, partly in section, of a welding gun including a preferred embodiment of the present invention.

FIG. 2 is a top plan view thereof.

FIG. 3 is a bottom view thereof.

FIG. 4 is a sectional view taken along the line IV—IV in FIG. 1.

FIG. 5 is a sectional view of a modified embodiment thereof.

FIG. 6 is a sectional view of another modified embodiment thereof.

DETAILED DESCRIPTION OF THE PREFERRED EMBODIMENTS

FIGS. 1 to 3 show a resistance welding gun including the present invention, wherein a pair of gun arms A, A are pivotally supported on a shaft 2 provided on a front end portion of a gun main body 1. The two gun arms A, A are arranged to be operated to open and close by an operation cylinder 3.

Each of these guns arms A, A has main body 5 having at its front end portion an electrode holder 4. The rear end portion is connected by bolts 7 to a supporting member 6 which is pivotally supported on the shaft 2. The main body 5 is provided with a conductor 9 for connecting the electrode holder 4 and a secondary conductor terminal 8 provided in the rear thereof, and additionally, with a water passage means 10 for cooling.

According to this invention, the conductor 9 is formed of a plate-like member in which at least one side surface has the water passage means 10. The main body 5 has at least one plate-like member which is directly or indirectly fixed to the one side surface of the conductor 9.

In the embodiment of FIG. 4, for instance, the plate-like member comprising the conductor 9 is comparatively large in thickness and two plate-like members forming the main body 5 are fixed to the two side surfaces of the conductor 9. The water passage means 10 is in the form of a groove formed in the side surfaces of the conductor 9. Thus, the water passage means 10 is a pair of passages provided on both side surfaces of the conductor 9. One of the passages is connected to an inlet opening 10a and the other is connected to an outlet opening 10b.

In a modified embodiment shown in FIG. 5, the conductor 9 has the water passage means 10, which is formed by two grooves provided in one side surface of conductor 9, and the main body 5 is formed of a single plate-like member fixed to the one side surface of the conductor 9.

Though, in the foregoing embodiments the water passage means 10 is in the form of a groove made in the side surface of the conductor 9, the present invention is not limited thereto. Namely, in the embodiment as shown in FIG. 6, for instance, the water passage means 10 is formed of a pair of copper pipes 10c, 10c fixed to one side surface of the conductor 9, which is formed of a plate-like member. The gun arm main body 5 comprises a single plate-like member fixed through the copper pipes 10c, 10c to the conductor 9.

A flexible conductor 8a extends rearwards from the secondary conductor terminal 8 and an insulation layer 11 is positioned between main body 5 and support member 6. The conductor 9 may be made of a copper alloy which is high in conductivity, and the main body 5 is made of a carbon steel which is a magnetic substance.

Thus, according to the present invention, the conductor is formed of a plate-like member having at least one side surface with a water passage means for cooling and the gun arm main body comprises at least one plate-like member fixed to the side surface of the conductor member. In comparison with a conventional gun arm wherein the main body is formed of a tubular member, the gun arm of the present invention can be made smaller in size, and additionally, the main body is reinforced by including the conductor so that the arm enhances its mechanical strength. In addition, an increase in the electric current capacity can be effected by including the conductor, and also the apparatus can be simplified in construction and lowered in cost.

The present invention can be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A gun arm for a resistance welding gun, said gun arm comprising:
    (a) a main body;
    (b) an electrode holder mounted on the front portion of said main body;
    (c) a support member fixed to the rear portion of said main body; and
    (d) said main body comprising conductor plate means having a water passage means on at least one side thereof and body plate means fixed to said at least one side of said conductor plate means and in contact with said water passage means.

2. A gun arm as set forth in claim 1, wherein said water passage means comprises at least one groove formed in said conductor plate means, said groove being covered by said body plate means.

3. A gun arm as set forth in claim 2, wherein said water passage means comprises at least two grooves, said grooves both being located in said at least one side of said conductor plate means.

4. A gun arm as set forth in claim 2, wherein said water passage means comprises at least two grooves and said at least one side of said conductor plate means comprises two sides; wherein at least one of said grooves is located in each of said sides of said conductor plate means; and wherein said body plate means comprises a plate member fixed to each of said sides.

5. A gun arm as set forth in claim 1, wherein said water passage means comprises at least one pipe means and wherein said body plate means comprises a plate member fixed to each of said sides.

* * * * *